United States Patent

Lindner et al.

Patent Number: 5,147,955
Date of Patent: Sep. 15, 1992

[54] PHOSPHORUS CONTAINING POLYMERS

[75] Inventors: Christian Lindner, Cologne; Siegfried Korte, Odenthal, both of Fed. Rep. of Germany

[73] Assignee: Bayer Aktiengesellschaft, Leverkusen-Bayerwerk, Fed. Rep. of Germany

[21] Appl. No.: 729,995

[22] Filed: Jul. 15, 1991

[30] Foreign Application Priority Data

Jul. 27, 1990 [DE] Fed. Rep. of Germany ....... 4023818

[51] Int. Cl.$^5$ .............................................. C08F 34/02
[52] U.S. Cl. ................................... 526/271; 526/278; 526/261
[58] Field of Search .................. 526/271, 278, 261

[56] References Cited

U.S. PATENT DOCUMENTS 3,684,779  8/1972  Rapko ................... 526/271
5,026,803  6/1991  Lindner et al. .......... 526/271

Primary Examiner—Joseph L. Schofer
Assistant Examiner—Alex H. Walker
Attorney, Agent, or Firm—Connolly & Hutz

[57] ABSTRACT

Copolymers of
a) phosphonic acid derivatives corresponding to formula (I)

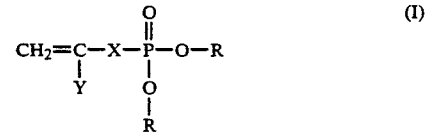

wherein
Y represents H or $CH_3$,
X represents a single bond or $-CH_2-$,
R represents an aryl or alkyl,
b) maleic anhydride and
c) a polymerizable compound containing two or more allyl or methally groups in the molecule.

5 Claims, No Drawings

PHOSPHORUS CONTAINING POLYMERS

This invention relates to new polymers based on unsaturated phosphonic acid esters of high phosphorus content having particular flame resistance and resistance to aging.

Unsaturated phosphonic acid derivatives are known as co-monomers for the production of polymers, although the quantity in which they can be incorporated in the polymers by radical polymerization is very limited so that it is only possible to produce copolymers having relatively low phosphorus contents. On the other hand, there is a need for phosphorus-containing polymers which have not only high phosphorus contents, but also adapted reactivities and polarities.

It has been found that the combination of certain monomers gives rise to polymers of high phosphorus content and, at the same time, leads to a new class of reactive maleic anhydride polymers. This is surprising because, under normal radical polymerization conditions, the individual monomers a), b) and c) do not homopolymerize to high molecular weight products but, at best, yield crosslinked products (in the case of monomers c); monomers a) and b) as well as a) and c) show no tendency towards copolymerization.

Accordingly, the present invention relates to copolymers of a) phosphonic acid derivatives corresponding to formula (I)

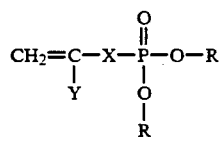

wherein
Y represents H or $CH_3$,
X represents a single bond or $-CH_2-$,
R represents an aryl or alkyl,
b) maleic anhydride and
c) a polymerizable compound containing two or more allyl or methallyl groups in the molecule.

Preferred phosphonic acid derivatives a) are compounds corresponding to formula (I) in which
X represents $-CH_2-$ and
R represents $C_{1-8}$ alkyl and $C_{6-12}$ aryl radicals which may optionally be substituted by O—, N—, halogen atoms.

Suitable radicals R are, for example, phenyl, naphthyl, halogen-substituted phenyl, methoxyphenyl, ethoxyphenyl, acetamidophenyl, methyl, ethyl, propyl, butyl, hexyl, chloroethyl.

Particularly preferred polymers are obtained when triallyl cyanurate or triallyl isocyanurate is used as the polymerizable compound c).

The molecular weight of the polymers according to the present invention can vary within wide limits. Accordingly, polymers according to the invention include oligomers, soluble polymers, branched soluble polymers, partly crosslinked polymers and highly crosslinked polymers. Crosslinked polymers require particular conduct of the polymerization reaction (high monomer conversion in the polymerization; high concentration of the monomers, particular temperature control, certain initiators) and certain quantities of c) or the co-use of typical crosslinking monomers, for example polyunsaturated, polymerizable compounds, such as divinyl benzene, allyl acrylate, allyl methacrylate, ethylenediamine bis-acrylamide, bis-acrylates and methacrylates of $C_{2-6}$ alkylene diols (ethylene glycol, butylene glycol, propylene glycol).

In addition to a), b) and c), other vinyl monomers may be copolymerized, preferably in quantities of up to 20% by weight, based on the total quantity of the resulting polymer; for example styrenes, α-methyl styrene, acrylonitrile, methacrylonitrile, vinyl acetate, vinyl propionate, vinyl ether, $C_{1-8}$ acrylates, maleic acid semiesters, maleic acid imides, dienes (such as butadiene, isoprene, chloroprene), vinyl chloride, vinylidene chloride.

Preferred polymers according to the invention contain up to 60% by weight monomer units a) and at least 40% by weight monomer units b)+c). The ratio by weight of b) to c) is preferably from 1:20 to 20:1.

Particularly preferred polymers contain from 5 to 50% by weight monomer units a) and from 95 to 50% by weight monomer units b)+c).

The polymers are colorless solids which, although generally insoluble in water, may be dissolved in water, preferably in an alkaline medium, providing they contain a sufficient quantity of maleic anhydride units and are not crosslinked, in which case viscous aqueous solutions may be formed, depending on the molecular weight of the polymers.

The polymers according to the invention may be prepared by radical copolymerization of the monomers a), b), c) at from 20° to 100° C. Preferred polymerization processes are continuous, semicontinuous or discontinuous solution and bulk polymerization. Inert aromatic hydrocarbons, such as benzene, toluene, ethyl benzene, are used for the solution polymerization. The polymerization reaction may be initiated by typical radical initiators, such as peroxides, per-esters, hydroperoxides, azo compounds, preferably by azoisobutyrodinitriles, at temperatures of preferably from 60° to 90° C.

The initiator is preferably used in quantities of from 0.1 to 1% by weight, based on the monomers to be polymerized. The conversion and molecular weight of the polymers are also determined by the concentration of the monomers in the polymerization mixture, preferably at high concentra-tions of monomers, for example at ratios by weight of monomers to solvent (medium) of from 40:60 to 100:0. For example, the polymerization conversion increases with increasing monomer concentration, as do the molecular weights of the polymer and the degree of crosslinking.

The polymers may be removed from the reaction mixture by known methods, such as precipitation and evaporation in suitable units. They are solids with softening temperatures above room temperature and may be used, for example, as thickeners and to improve viscosity.

By (partial) hydrolysis of the anhydride structures, polarity and, hence, compatibility can be varied within wide limits. Accordingly, the polymers according to the invention are particularly suitable for use as additives for polymer mixtures (for example paints and plastics). Their surprising aging and color-retaining properties inter alia are worth emphasizing. By comparison with typical low molecular weight additives, such as phosphorus compounds (for example phosphoric acid esters), for synthetic materials, the polymers according to the present invention are more stable and are there-

EXAMPLES

EXAMPLE 1

A mixture of 17.8 parts by weight allyl phosphonic acid diethyl ester,
9.8 parts by weight maleic anhydride,
8.3 parts by weight triallyl cyanurate,
30 parts by weight ethyl benzene and
1 part by weight azoisobutyronitrile is polymerized with stirring for 20 hours at 75° C. After 25 hours, the polymer formed is isolated by precipitation with isopropanol, washed and dried to form a powder. Yield of polymer: 75% by weight; phosphorus content of the polymer: 7.1% by weight; [η], as measured in dimethyl formamide at 20° C.: 0.11 dl/g.

EXAMPLE 2

A mixture of 7.8 parts by weight allyl phosphonic acid diethyl ester,
9.8 parts by weight maleic anhydride,
8.3 parts by weight triallyl cyanurate,
30 parts by weight ethyl benzene and
1.5 parts by weight azoisobutyronitrile is polymerized as in Example 1.

Yield of polymer: 83% by weight; phosphorus content of the polymer: 8.2% by weight; [η], as measured in dimethyl formamide at 20° C.: 0.10 dl/g.

EXAMPLE 3

The water-insoluble polymer of Example 1 is stirred into water (1 part by weight to 20 parts by weight water). The polymer can be hydrolyzed by addition of 1 N sodium hydroxide; a viscous clear polymer solution is formed.

EXAMPLE 4 (COMPARISON)

A mixture of 7.8 parts by weight allyl phosphonic acid diethyl ester,
9.8 parts by weight maleic anhydride,
30 parts by weight ethyl benzene and
1 part by weight azoisobutyronitrile is reacted as in Example 1. No polymer is formed.

EXAMPLE 5 (COMPARISON)

A mixture of 17.8 parts by weight allyl phosphonic acid diethyl ester,
8.3 parts by weight triallyl cyanurate,
30 parts by weight ethyl benzene and
1 part by weight azoisobutyronitrile is reacted as in Example 1. No polymer is formed.

EXAMPLE 6

A mixture of 19.2 parts by weight methallyl phosphonic acid diethyl ester,
9.8 parts by weight maleic anhydride,
8.3 parts by weight triallyl cyanurate,
30 parts by weight ethyl benzene and
1 part by weight azoisobutyronitrile is polymerized as in Example 1.

Yield of polymer: 80% by weight; phosphorus content of the polymer: 8.1% by weight; [η], as measured in dimethyl formamide at 20° C.: 0.15 dl/g.

EXAMPLE 7

A mixture of 17.8 parts by weight allyl phosphonic acid diethyl ester,
9.0 parts by weight maleic anhydride,
9.1 parts by weight triallyl cyanurate,
20 parts by weight ethyl benzene and
1 part by weight azoisobutyronitrile is polymerized with stirring for 20 hours at 75° C. After 25 hours, the reaction is reactivated with 0.5 part by weight azoisobutyronitrile, the temperature is increased to from 80° to 85° C. and the polymerization reaction is continued in a high-viscosity stirring unit. After 10 hours, a gel has formed. The partly crosslinked polymer has a gel content (as measured in dimethyl formamide) of 35% by weight.

We claim:

1. Copolymers of
   a) phosphonic acid derivatives corresponding to formula (I)

$$CH_2=C-X-\overset{\overset{O}{\|}}{\underset{\underset{R}{\overset{|}{O}}}{P}}-O-R$$
$$\phantom{CH_2=C-}\underset{}{|}$$
$$\phantom{CH_2=C-}Y$$

(I)

wherein
   Y represents H or $CH_3$,
   X represents a single bond or $-CH_2-$,
   R represents an aryl, alkyl,
   b) maleic anhydride and
   c) a polymerizable compound containing two or more allyl or methallyl groups in the molecule.

2. Copolymers as claimed in claim 1, in which c) is triallyl cyanurate or triallyl isocyanurate.

3. A process for the production of the polymers claimed in claim 1, characterized in that the monomers a), b) and c) are radically terpolymerized in bulk or in solution at a ratio by weight of the sum total of the monomers a) + b) +c) to solvent (medium of from 40:60 to 100:0.

4. The copolymer of claim 1 containing up to 60% by weight monomer units a) and at least 40% by weight combined monomer units b) and c).

5. The copolymer of claim 4 containing 5 to 50% by weight of monomer units a) and from 95 to 50% by weight combined monomer units b) and c).

* * * * *